United States Patent [19]

Sekhar et al.

[11] Patent Number: 5,527,442

[45] Date of Patent: Jun. 18, 1996

[54] REFRACTORY PROTECTIVE COATED ELECTROYLYTIC CELL COMPONENTS

[75] Inventors: Jainagesh A. Sekhar, Cincinnati, Ohio; Vittorio de Nora, Nassau, Bahamas

[73] Assignee: Moltech Invent S.A., Luxembourg

[21] Appl. No.: 143,178

[22] Filed: Oct. 26, 1993

Related U.S. Application Data

[62] Division of Ser. No. 861,513, Apr. 1, 1992, Pat. No. 5,310,476.

[51] Int. Cl.$^6$ ..................... C25C 3/08
[52] U.S. Cl. ............... 204/243 R; 204/290 R; 204/293; 204/294; 204/247; 428/614; 428/627; 428/633; 428/641; 428/660; 428/661; 428/662; 428/663; 428/667
[58] Field of Search ............. 204/67, 243 R–247, 204/290 R, 294, 293; 205/230; 428/660, 661–667, 641, 680–681, 614, 632–633, 627

[56] References Cited

U.S. PATENT DOCUMENTS

| | | | |
|---|---|---|---|
| 2,859,138 | 11/1958 | Blanchard | 117/169 |
| 2,866,724 | 12/1958 | Alexander | 177/228 |
| 2,915,442 | 12/1959 | Lewis | 204/67 |
| 3,016,288 | 1/1962 | Andrieux et al. | 23/204 |
| 3,028,324 | 4/1962 | Ransley | 204/67 |
| 3,090,094 | 5/1963 | Schwartzwalder et al. | 25/156 |
| 3,097,930 | 7/1963 | Holland | 25/156 |
| 3,111,396 | 11/1963 | Ball | 25/156 |
| 3,156,639 | 11/1964 | Kibby | 204/243 |
| 3,215,615 | 11/1965 | Ransley | 204/279 |
| 3,249,460 | 3/1966 | Gerry | 117/70 |
| 3,274,093 | 9/1966 | McMinn | 204/243 |

(List continued on next page.)

FOREIGN PATENT DOCUMENTS

| | | |
|---|---|---|
| 0126555 | 11/1984 | European Pat. Off. . |
| 0192602 | 8/1986 | European Pat. Off. . |
| 0258510 | 9/1986 | European Pat. Off. . |
| 0257708 | 8/1987 | European Pat. Off. . |
| 9007013 | 12/1988 | European Pat. Off. . |
| 0367372 | 5/1989 | European Pat. Off. . |
| 0431165 | 6/1989 | European Pat. Off. . |
| 0426485 | 2/1990 | European Pat. Off. . |
| 9003956 | 4/1990 | European Pat. Off. . |
| 9013513 | 11/1990 | European Pat. Off. . |
| 0404943 | 1/1991 | European Pat. Off. . |
| 9200399 | 6/1991 | European Pat. Off. . |
| 1173804 | 10/1958 | France . |
| 2144156 | 4/1972 | Germany . |
| 3802670 | 8/1989 | Germany . |
| 1177829 | 1/1970 | United Kingdom . |

OTHER PUBLICATIONS

J. W. McCauley et al. "Simultaneous Preparation . . . ", Ceramic Engineering, 3 (1982), pp. 538–554.

R. W. Rice et al., "Effects of Self–Propagating . . . " Ceramic Engineering, 7 (1986), pp. 737–749.

H. C. Yi, Journal Materials Science, 25 (1990) pp. 1159–1168.

Self–Propagating High–Temperature (Combustion) Synthesis (SHS) of Powder–Compacted Materials A Not–So–Radical Proposal for Selecting Radical Substitutions in Markush–Type Claims – Peter J. Dehlinger.

C. H. Samans "Powder Metallurgy", American Society For Metals, Metals Handbook, 1948, pp. 47–52.

*Primary Examiner*—Donald R. Valentine

[57] ABSTRACT

A carbonaceous, refractory or metal alloy substrate material coated with a refractory material, the refractory material including at least one of borides, silicides, nitrides, aluminides, carbides, phosphides, oxides, metal alloys, intermetallic compounds and mixtures of one of titanium, chromium, zirconium, hafnium, vanadium, silicon, niobium, tantalum, nickel, molybdenum and iron and at least one refractory oxide of rare earth metals. An aluminum production cell including a component made up of a material coated with the coating described above is also disclosed.

11 Claims, 4 Drawing Sheets

U.S. PATENT DOCUMENTS

| | | | |
|---|---|---|---|
| 3,314,876 | 4/1967 | Ransley | 204/291 |
| 3,330,756 | 7/1967 | Ransley | 204/279 |
| 3,345,440 | 10/1967 | Googin et al. | 264/29 |
| 3,348,929 | 10/1967 | Valtschev et al. | 29/180 |
| 3,400,061 | 9/1968 | Lewis et al. | 204/67 |
| 3,404,031 | 10/1968 | Clayton et al. | 117/201 |
| 3,457,158 | 10/1969 | Bullough | 204/243 |
| 3,531,565 | 9/1970 | Webb et al. | 424/92 |
| 3,558,450 | 1/1971 | Ashe, Jr. et al. | 204/59 |
| 3,617,358 | 11/1971 | Dittrich et al. | 117/105.2 |
| 3,634,736 | 1/1972 | Boos et al. | 317/230 |
| 3,661,736 | 5/1972 | Holliday | 204/67 |
| 3,705,791 | 12/1972 | Bredzs | 29/195 |
| 3,726,643 | 4/1973 | Merzhanov et al. | 423/409 |
| 3,778,249 | 12/1973 | Benjamin et al. | 25/0.5 BC |
| 3,852,107 | 12/1974 | Lorkin et al. | 117/228 |
| 3,856,650 | 12/1974 | Kugler et al. | 204/243 |
| 3,859,198 | 1/1975 | Emblem et al. | 204/290 |
| 3,864,164 | 2/1975 | Hinchcliffe et al. | 117/217 |
| 3,893,917 | 7/1975 | Pryor et al. | 210/69 |
| 3,939,028 | 2/1976 | Schiffarth et al. | 156/306 |
| 3,947,363 | 3/1976 | Pryor et al. | 210/510 |
| 3,962,081 | 6/1976 | Yarwood et al. | 210/69 |
| 3,964,924 | 6/1976 | Kurzeja | 106/286 |
| 3,969,696 | 7/1976 | Wolfe et al. | 219/541 |
| 4,003,014 | 1/1977 | Branson et al. | 338/329 |
| 4,024,056 | 5/1977 | Yarwood et al. | 210/69 |
| 4,052,288 | 10/1977 | Sala | 204/243 |
| 4,081,371 | 3/1978 | Yarwood et al. | 210/69 |
| 4,093,524 | 6/1978 | Payne | 204/61 |
| 4,202,691 | 5/1980 | Yurasko, Jr. | 75/252 |
| 4,217,948 | 8/1980 | Merzhanov et al. | 164/115 |
| 4,257,810 | 3/1981 | Narumiya | 106/42 |
| 4,258,099 | 3/1981 | Narumiya | 428/311 |
| 4,267,435 | 5/1981 | Best | 219/552 |
| 4,292,345 | 9/1981 | Kolesnik et al. | 427/113 |
| 4,308,114 | 12/1981 | Das et al. | 204/67 |
| 4,308,115 | 12/1981 | Foster, Jr. et al. | 204/67 |
| 4,312,718 | 1/1982 | Watanabe et al. | 204/60 |
| 4,333,813 | 6/1982 | Kaplan et al. | 204/243 |
| 4,333,818 | 6/1982 | Kalpan et al. | 204/67 |
| 4,342,637 | 8/1982 | Withers et al. | 204/282 |
| 4,374,761 | 2/1983 | Ray | 252/519 |
| 4,376,690 | 3/1983 | Kugler | 204/243 |
| 4,384,995 | 5/1983 | Stevens | 260/112.5 |
| 4,391,918 | 7/1983 | Brockmeyer | 501/127 |
| 4,405,433 | 9/1983 | Payne | 204/225 |
| 4,418,097 | 11/1983 | Misra | 427/113 |
| 4,420,294 | 12/1983 | Lichtinghagen | 425/79 |
| 4,439,382 | 3/1984 | Joo et al. | 264/29.5 |
| 4,455,211 | 6/1984 | Ray et al. | 204/293 |
| 4,459,363 | 7/1984 | Holt | 501/96 |
| 4,466,996 | 8/1984 | Buxall et al. | 427/122 |
| 4,481,052 | 11/1984 | Buchta et al. | 156/155 |
| 4,487,804 | 12/1984 | Reven | 428/408 |
| 4,508,788 | 4/1985 | Cheney | 428/570 |
| 4,517,037 | 5/1985 | Francis et al. | 156/89 |
| 4,535,035 | 8/1985 | Smialek et al. | 428/698 |
| 4,540,475 | 9/1985 | DeAngelis | 204/67 |
| 4,552,630 | 11/1985 | Wheeler et al. | 204/67 |
| 4,559,270 | 12/1985 | Sara | 428/408 |
| 4,560,448 | 12/1985 | Sane et al. | 204/67 |
| 4,567,103 | 1/1986 | Sara | 428/408 |
| 4,582,553 | 4/1986 | Buchta et al. | 156/242 |
| 4,585,675 | 4/1986 | Shuford | 427/376.2 |
| 4,592,820 | 6/1986 | McGeer | 204/243 |
| 4,595,545 | 6/1986 | Sane | 264/65 |
| 4,596,637 | 6/1986 | Kozarek et al. | |
| 4,600,481 | 7/1986 | Sane et al. | 204/67 |
| 4,610,726 | 9/1986 | King | 75/233 |
| 4,613,375 | 9/1986 | Forster et al. | 106/281 |
| 4,614,569 | 9/1986 | Duruz et al. | 205/230 X |
| 4,625,261 | 11/1986 | Weeks et al. | 361/433 |
| 4,650,552 | 3/1987 | De Nora | 204/67 |
| 4,656,906 | 4/1987 | Mazieka | 83/451 |
| 4,670,201 | 6/1987 | Montgomery et al. | 264/26 |
| 4,670,407 | 6/1987 | Kiehl et al. | 501/87 |
| 4,678,548 | 7/1987 | Brown | 204/67 |
| 4,678,760 | 7/1987 | Ray | 501/96 |
| 4,680,094 | 7/1987 | Duruz | 204/67 |
| 4,681,671 | 7/1987 | Duruz | 204/67 |
| 4,681,819 | 7/1987 | Gnyra | 428/697 |
| 4,683,037 | 7/1987 | Duruz | 204/64 |
| 4,697,632 | 10/1987 | Lirones | 164/369 |
| 4,699,763 | 10/1987 | Sinharoy et al. | 419/11 |
| 4,710,348 | 12/1987 | Brupbacher et al. | 420/129 |
| 4,711,666 | 12/1987 | Chapman | 106/14.12 |
| 4,726,995 | 2/1988 | Chiu | 428/408 |
| 4,737,247 | 4/1988 | Jarrett | 204/67 |
| 4,738,389 | 4/1988 | Moshier et al. | 228/198 |
| 4,747,873 | 5/1988 | Kamioka | 74/229 |
| 4,751,048 | 6/1988 | Christodoulou et al. | |
| 4,769,074 | 9/1988 | Holcombe, Jr. et al. | 106/14.12 |
| 4,769,237 | 9/1988 | Bittle et al. | 424/88 |
| 4,772,452 | 9/1988 | Brupbacher et al. | 420/129 |
| 4,774,052 | 9/1988 | Nagle et al. | 420/129 |
| 4,800,065 | 1/1989 | Christodoulou et al. | 420/129 |
| 4,808,372 | 2/1989 | Koczak et al. | 420/457 |
| 4,836,982 | 6/1989 | Brupbacher et al. | 420/129 |
| 4,865,701 | 9/1989 | Beck et al. | 204/67 |
| 4,877,759 | 10/1989 | Holt et al. | 501/96 |
| 4,885,073 | 12/1989 | Guangchun et al. | 204/291 |
| 4,900,698 | 2/1990 | Lundsager | 501/80 |
| 4,902,457 | 2/1990 | Wada et al. | 264/43 |
| 4,904,424 | 2/1990 | Johnson | 264/566 |
| 4,909,842 | 3/1990 | Dunmead et al. | 75/236 |
| 4,915,903 | 4/1990 | Brupbacher et al. | 429/128 |
| 4,915,905 | 4/1990 | Kampe et al. | 420/418 |
| 4,919,771 | 4/1990 | Wilkening | 204/67 |
| 4,921,731 | 5/1990 | Clark et al. | 427/314 |
| 4,929,328 | 5/1990 | Besmann et al. | 204/279 |
| 4,935,265 | 6/1990 | Pike | 427/226 |
| 4,948,676 | 8/1990 | Darracq et al. | 428/539 |
| 4,948,761 | 8/1990 | Hida | 501/89 |
| 4,957,885 | 9/1990 | Hida | 501/89 |
| 4,961,778 | 10/1990 | Pyzik et al. | 75/230 |
| 4,965,044 | 10/1990 | Miyamoto et al. | 419/12 |
| 4,966,674 | 10/1990 | Bannochie et al. | 204/291 X |
| 4,975,191 | 12/1990 | Brockmeyer et al. | 210/510 |
| 4,975,412 | 12/1990 | Okazaki et al. | 505/1 |
| 4,983,423 | 1/1991 | Goldsmith | 427/230 |
| 4,985,202 | 1/1991 | Moshier et al. | 420/590 |
| 4,988,480 | 1/1991 | Merzhanov et al. | 419/11 |
| 4,988,645 | 1/1991 | Holt et al. | 501/91 |
| 4,990,295 | 2/1991 | Hida | 264/65 |
| 4,996,024 | 2/1991 | Nishio et al. | 419/40 |
| 4,999,144 | 3/1991 | Miyamoto | 564/56 |
| 5,004,524 | 4/1991 | Duruz | 204/243 |
| 5,006,290 | 4/1991 | Hida | 264/65 |
| 5,015,343 | 5/1991 | LaCamera et al. | 204/67 |
| 5,019,225 | 5/1991 | Darracq et al. | 204/290 R X |
| 5,019,454 | 5/1991 | Busse | 428/570 |
| 5,022,975 | 6/1991 | Gordon | 204/277 |
| 5,022,991 | 6/1991 | Day et al. | 210/506 |
| 5,030,600 | 7/1991 | Hida et al. | 501/98 |
| 5,032,332 | 7/1991 | Hida et al. | 214/65 |
| 5,069,764 | 12/1991 | Watanabe et al. | 204/60 |
| 5,071,533 | 12/1991 | de Nora et al. | 204/243 |
| 5,071,797 | 12/1991 | Hida | 501/87 |
| 5,077,246 | 12/1991 | Weaver et al. | 501/98 |
| 5,158,655 | 10/1992 | Townsend | 204/67 |
| 5,217,583 | 8/1993 | Sekhar et al. | 204/67 |

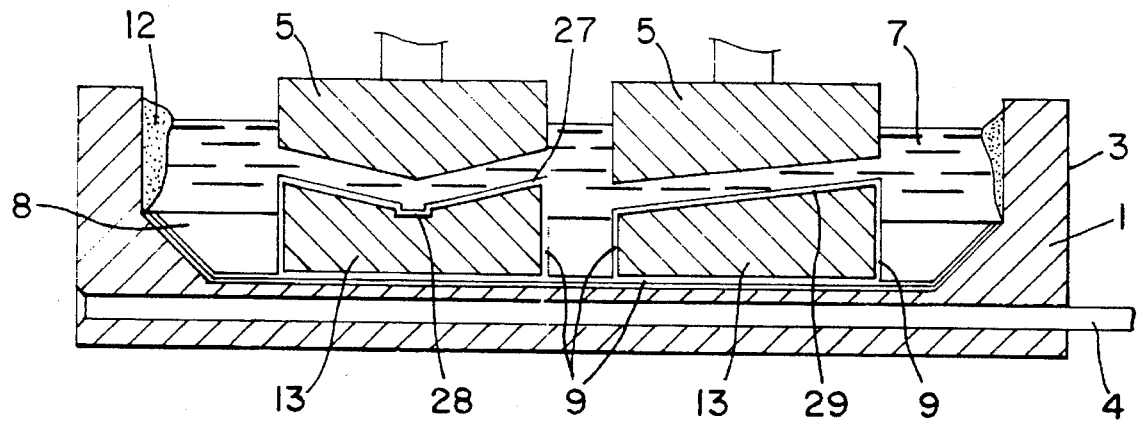
Fig. 4
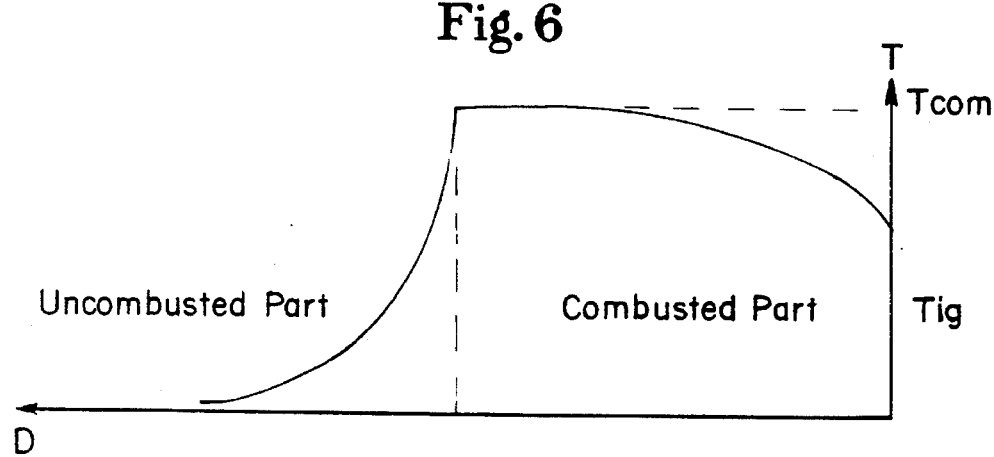
Fig. 6
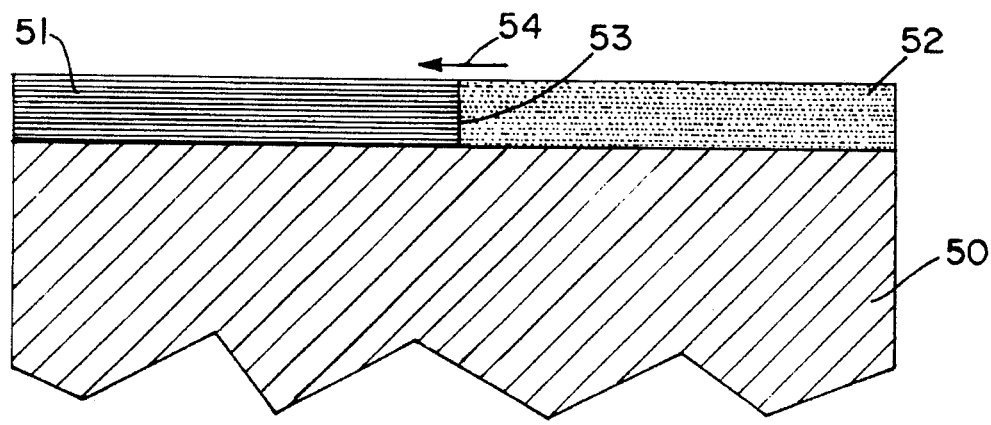

REFRACTORY PROTECTIVE COATED ELECTROYLYTIC CELL COMPONENTS

This is a divisional, of application Ser. No. 07/861,513 filed on Apr. 1, 1992 now U.S. Pat. No. 5,310,476.

FIELD OF THE INVENTION

Generally, the invention relates to the development of a coating technology to apply different compositions of refractory materials such as those containing hard metals, particularly titanium borides, metallic alloys, intermetallic compounds, cermets, oxides, metals and ceramics to the surface of substrates made of different materials such as carbonaceous materials, refractory materials, ceramics, cermets, oxides, metallic alloys (particularly those of iron, nickel, aluminum, and copper) and intermetallic compounds.

Such substrates may in particular be components of electrolytic cells operating at high temperatures, particularly aluminium production cells. The present invention thus more specifically relates to a novel method of application of adherent protective coatings of refractory material to the surface of substrates of components of electrolytic cells for molten salt electrolysis for the electrowinning of metals and operating at high temperatures, particularly for the production of aluminium and as well to novel designs of such cells and their operation.

The protective coating is a refractory material or a combination of refractory materials containing aluminum-wettable hard metals, particularly titanium borides or other materials consisting of metallic alloys, intermetallic compounds, cermets, oxides and ceramics on the surface of the substrates e.g. of electrolytic cell components, in particular an adherent protective coating of aluminium-wettable refractory material on the surface of a carbonaceous or refractory substrate lining the cell bottom floor of an aluminium production cell.

The invention also relates to composite materials comprising a carbonaceous or refractory substrate coated with an aluminium-wettable refractory material and to the use of the coated composite materials in such cells.

BACKGROUND OF THE INVENTION

Among the metals obtained in electrolytic cells operating at high temperature in a molten salt electrolyte containing an oxide or compound of the metal to be electrowon, aluminium is the most important and the invention will describe in particular the protection of components of aluminium cells, more particularly the protection of the cell cathode bottom by applying an aluminium-wettable, adherent coating.

Aluminium is produced conventionally by the Hall-Héroult process, by the electrolysis of alumina dissolved in molten salt containing cryolite at temperatures around 950° C. A Hall-Héroult reduction cell typically has a steel shell provided with an insulating lining of refractory material, which in turn has a lining of carbon which contacts the molten constituents. Conductor bars connected to the negative pole of a direct current source are embedded in the carbon cathode substrate forming the cell bottom floor. The cathode substrate is usually an anthracite based carbon lining made of prebaked cathode blocks, joined with a ramming mixture of anthracite, coke, and coal tar.

In Hall-Héroult cells, a molten aluminium pool acts as the cathode. The carbon lining or cathode material has a useful life of three to eight years, or even less under adverse conditions. The deterioration of the cathode bottom is due to erosion and penetration of electrolyte and liquid aluminium as well as intercalation of sodium, which causes swelling and deformation of the cathode carbon blocks and ramming mix. In addition, the penetration of sodium species and other ingredients of cryolite or air leads to the formation of toxic compounds including cyanides.

Difficulties in operation also arise from the accumulation of undissolved alumina sludge on the surface of the carbon cathode beneath the aluminium pool which forms insulating regions on the cell bottom. Penetration of cryolite and aluminium through the carbon body and the deformation of the cathode carbon blocks also cause displacement of such cathode blocks. Due to displacement of the cathode blocks, aluminium reaches the steel cathode conductor bars causing corrosion thereof leading to deterioration of the electrical contact and an excessive iron content in the aluminium metal produced.

A major drawback of carbon as cathode material is that it is not wetted by aluminium. This necessitates maintaining a deep pool of aluminium (at least 100–250 mm thick) in order to ensure a certain protection of the carbon blocks and an effective contact over the cathode surface. But electromagnetic forces create waves in the molten aluminium and, to avoid short circuiting with the anode, the anode-to-cathode distance (ACD) must be kept at a safe minimum value, usually 40 to 60 mm. For conventional cells, there is a minimum ACD below which the current efficiency drops drastically, due to short-circuiting between the aluminium pool and the anode. The electrical resistance of the electrolyte in the inter-electrode gap causes a voltage drop from 1.8 to 2.7 volts, which represents from 40 to 60 percent of the total voltage drop, and is the largest single component of the voltage drop in a given cell.

To reduce the ACD and associated voltage drop, extensive research has been carried out with Refractory Hard Metals (RHM) such as $TiB_2$ as cathode materials. $TiB_2$ and other RHM's are practically insoluble in aluminium, have a low electrical resistance, and are wetted by aluminium. This should allow aluminium to be electrolytically deposited directly on an RHM cathode surface, and should avoid the necessity for a deep aluminium pool. Because titanium diboride and similar Refractory Hard Metals are wettable by aluminium, resistant to the corrosive environment of an aluminium production cell, and are good electrical conductors, numerous cell designs utilizing Refractory Hard Metal have been proposed, which would present many advantages, notably including the saving of energy by reducing the ACD.

The use of titanium diboride and other RHM current-conducting elements in electrolytic aluminium production cells is described in U.S. Pat. Nos. 2,915,442, 3,028,324, 3,215,615, 3,314,876, 3,330,756, 3,156,639, 3,274,093 and 3,400,061. Despite extensive efforts and the potential advantages of having surfaces of titanium diboride at the cell cathode bottom, such propositions have not been commercially adopted by the aluminium industry.

The non-acceptance of tiles and other methods of applying layers of $TiB_2$ and other RHM materials on the surface of aluminium production cells is due to their lack of stability in the operating conditions, in addition to their cost. The failure of these materials is associated with penetration of the electrolyte when not perfectly wetted by aluminium, and attack by aluminium because of impurities in the RHM structure. In RHM pieces such as tiles, oxygen impurities tend to segregate along grain boundaries leading to rapid attack by aluminium metal and/or by cryolite. To combat disintegration, it has been proposed to use highly pure $TiB_2$ powder to make materials containing less than 50 ppm oxygen. Such fabrication further increases the cost of the already-expensive materials. No cell utilizing $TiB_2$ tiles as cathode is known to have operated for long periods without loss of adhesion of the tiles, or their disintegration. Other reasons for failure of RHM tiles have been the lack of mechanical strength and resistance to thermal shock.

Various types of $TiB_2$ or RHM layers applied to carbon substrates have failed due to poor adherence and to differences in thermal expansion coefficients between the titanium diboride material and the carbon cathode block.

U.S. Pat. No. 3,400,061 describes a cell without an aluminium pool but with a drained cathode of Refractory Hard Metal which consists of a mixture of Refractory Hard Metal, at least 5 percent carbon, and 10 to 20% by weight of pitch binder, baked at 900° C. or more and rammed into place in the cell bottom. Such composite cathodes have found no commercial use probably due to susceptibility to attack by the electrolytic bath.

U.S. Pat. No. 4,093,524 discloses bonding tiles of titanium diboride and other Refractory Hard Metals to a conductive substrate such as graphite. But large differences in thermal expansion coefficients between the RHM tiles and the substrate cause problems.

U.S. Pat. No. 3,661,736 claims a composite drained cathode for an aluminium production cell, comprising particles or pieces of arc-melted "RHM alloy" embedded in an electrically conductive matrix of carbon or graphite and a particulate filler such as aluminium carbide, titanium carbide or titanium nitride. However, in operation, grain boundaries and the carbon or graphite matrix are attacked by electrolyte and/or aluminium, leading to rapid destruction of the cathode.

U.S. Pat. No. 4,308,114 discloses a cathode surface of RHM in a graphitic matrix made by mixing the RHM with a pitch binder and graphitizating at 2350° C. or above. Such cathodes are subject to early failure due to rapid ablation, and possible intercalation by sodium and erosion of the graphite matrix.

To avoid the problems encountered with tiles and with the previous coating methods, U.S. Pat. No. 4,466,996 proposed applying a coating composition comprising a preformed particulate RHM, such as $TiB_2$, a thermosetting binder, a carbonaceous filler and carbonaceous additives to a carbonaceous cathode substrate, followed by curing and carbonisation. But it is still not possible by this method to obtain coatings of satisfactory adherence that could withstand the operating conditions in an aluminium production cell. It has also proven impossible to produce adherent coatings of RHM on refractory substrates such as alumina.

U.S. Pat. No. 4,560,448 describes a structural component of an aluminium production cell which is in contact with molten aluminium, made of a non-wettable material such as alumina which is rendered wettable by a thin layer (up to 100 micrometer) of $TiB_2$. However, to prevent dissolution of this $TiB_2$ layer, the molten aluminium had to be maintained saturated with titanium and boron and this expedient was not acceptable.

U.S. Pat. No. 5,004,524 discloses a body of fused alumina or another refractory oxycompound having a multiplicity of discrete inclusions of $TiB_2$ or other aluminium-wettable RHM cast into its surface. This material is particularly suitable for non-current carrying cathode bottom floors of aluminium production cells, but in the long term even if the material may remain bound to the fused alumina and resist to corrosion, the manufacture at an acceptable cost remains a problem.

U.S. Pat. No. 4,595,545 discloses the production of titanium diboride or a mixture thereof with a carbide and/or a nitride of titanium, zirconium, hafnium, vanadium, niobium, tantalum, chromium, molybdenum or tungsten by carbothermic, carbo-aluminothermic or alumino-thermic reaction, under vacuum or an inert atmosphere, of a glass or microcristalline gel of oxide reactants prepared from organic alkoxide precursors. This glass or gel was then ground and formed into bodies and sintered into bodies of titanium diboride/alumina-based materials as components of aluminium production cells. But such sintered materials are subject to attack and grain-boundary corrosion when in contact with molten aluminium. Similar reactions, known as combustion synthesis, self-propagating high temperature synthesis or micropyretic reactions are known (see below, under the heading "Micropyretic Reactions"), but to date these reactions have not been applied to the production of refractory coatings on carbonaceous, refractory or other substrates in such a way, and with the right composition, as no lead to coatings with adequate adherence to survive the operating conditions in an aluminium production cell.

U.S. Pat. No. 4,600,481 proposed making components of aluminium production cells by infiltrating aluminium into a skeletal self-sustaining matrix of alumina or another refractory material which is normally non-wettable by molten aluminium, after having rendered the surface of the matrix wettable by molten aluminium for instance by treating the surface with a wetting agent such as titanium diboride, in particular with a titanium diboride composite material produced according to the previously-mentioned patent. In this case, only a temporary surface wetting was thought to be required to facilitate the infiltration, but in practice it was not easy to produce materials that sufficiently maintained the internal wetting to sustain long operating periods when the component was exposed externally to molten aluminium. Also, the described techniques have not been applied to external surfaces of refractory bodies to make them permanently wettable by molten aluminium.

The methods employed to date have thus not successfully produced adherent protective coatings of refractory materials, in particular aluminium-wettable refractory materials such as $TiB_2$ and other Refractory Hard Metals, on various substrates and in particular on carbonaceous or refractory substrates, that adhere to and remain firmly attached to the substrate in conditions such as encountered in aluminium production cells, the coating providing a permanent and perfectly protective surface that is wetted by molten aluminium.

SUMMARY OF THE INVENTION

The invention aims to overcome the deficiencies of past attempts to utilize refractory materials in particular Refractory Hard Metals as surface coatings on substrates, in particular but not exclusively carbonaceous, refractory and metallic substrates, for use generally for protecting the substrates from the corrosive attacks of liquids and gases, inter alia for use as cell components for molten salt electrolysis cells, especially for use as cathodes or other cell components of aluminium production cells.

The invention relates in particular to the protection of the surfaces of components of electrolytic cells, particularly those operating at high temperatures, from the attack of liquids and gases existing in the cells or formed during electrolysis by applying a refractory coating by utilizing novel micropyretic methods. A refractory coating or refractory material when mentioned in this description of the invention shall mean a material, whether carbonaceous, ceramic, or metallic, which can withstand high temperatures.

An object of the invention is to provide a method of producing refractory materials, in particular aluminium wettable refractory materials, making use of a micropyretic reaction in a slurry-applied reaction layer of such composition and so controlled that the method can produce extremely adherent refractory coatings on carbonaceous, refractory, metallic or other substrates that can inter alia be used as cathodes in aluminium production or more generally as any cell component where wettability with aluminium is desirable, as well as resistance to cryolite and oxidation. Other applications may make use of the material's excellent resistance to corrosion, in particular to oxidation, especially in high temperature environments.

The coating is obtained by applying to the surface of the substrate, e.g. of the component of the electrolytic cell which needs to be coated and protected, a well chosen micropyretic slurry which when dried is ignited to initiate a self-sustaining micropyretic reaction in the dried slurry, along a combustion front, to produce condensed matter forming a coating adherent to the surface of the substrate and protecting it.

The composition of the micropyretic slurry is chosen according to the physical and chemical characteristics of the substrate and the purpose of the coating. The slurry is preferably applied in several layers, the first layer(s) to facilitate adherence and the last layer(s) to provide protection.

The coatings obtained by the method according to the invention are well adherent to the different substrates, provide the required protection to the cell components and have the desired mechanical, physical, chemical, and electrochemical characteristics.

The coatings are impervious and adherent to the substrates and resistant to thermal shocks therefore protecting the substrates efficiently from the corrosive attacks of liquids, fumes and gases existing or produced in electrolytic cells, thus making them ideal for use in molten salt electrolysis cells, in particular those for aluminum production. In an electrolytic cell operating at high temperature all cell components have to be mechanically strong at the operating temperature and each one may have any additional required characteristic.

In the particular case of aluminium production cells, an aluminium-wettable, refractory, electrically conductive, adherent coating has been developed to be applied to the surface of the cell cathode bottom made of carbonaceous material to protect such carbonaceous material from the attack of sodium and air which produces deformation of the cathode blocks and formation of dangerous nitrogen compounds such as cyanides.

By protecting the carbonaceous cell components from attack by NaF or other aggressive ingredients of the electrolyte, the cell efficiency is improved. Because NaF in the electrolyte no longer reacts with the carbon cell bottom and walls, the cell functions with a defined bath ratio without a need to replenish the electrolyte with NaF.

The aluminum-wettable refractory coating will also permit the elimination of the thick aluminium pool required to partially protect the carbon cathode, enabling the cell to operate with a drained cathode. Other coatings have been developed to protect the upper part of the carbonaceous cell wall and cell cover and anode current feeders and holders from the attack of fluoride fumes and oxidation by oxygen or air and the lower part from the attack by the cryolite-containing electrolyte.

Special coatings have also been developed to protect anode substrates from the attack of oxygen and cryolite.

The protective effect of the coatings according to the invention is such as to enable the use of relatively inexpensive materials for the substrates. For instance, cheaper grades of graphite can be used instead of the more expensive anthracite forms of carbon, while providing improved resistance against the corrosive conditions in the cell environment.

The composite materials resulting from coating substrates according to the present invention can be utilized also as components of electrolytic cells for the production by molten salt electrolysis of other metals such as magnesium, sodium, potassium, titanium, and others, and also for cells operating at low temperatures and for the surfaces of any other parts of electrochemical equipment requiring electrochemical, chemical, or physical stability.

The present invention concerns a method which is not only superior and less costly than other suggested, well-known methods such as plasma or flame spray, electrodeposition and dip coating, but in many cases is the only applicable and efficient method.

According to the invention, a method has been developed for producing a component of an aluminium production cell which in operation of the cell is exposed to a molten electrolyte and/or to molten aluminium, which component comprises a substrate of carbonaceous or refractory material or a cermet, a metal, a refractory oxide, a metallic alloy or an intermetallic compound coated with a coating of refractory material. This method comprises applying to the substrate a micropyretic reaction layer from a slurry containing particulate reactants preferably in a colloidal carrier, and initiating a micropyretic reaction. More specifically, the invention relates to a method of producing a refractory adherent material by applying one or more layers of one or more micropyretic slurries one or more of which contains particulate reactants, to a substrate and drying each of them before applying the following layer, to provide on the substrate at least one dried layer containing the particulate reactants. The slurry-applied layer is then ignited to initiate a self-sustaining micropyretic reaction in the dried layer, along a combustion front, to produce condensed matter forming a coating of refractory material adherent to the surface of the substrate and protecting it.

To assist rapid wetting of the components by molten aluminium, the refractory material coated on the substrate may be exposed to molten aluminium in the presence of a flux assisting penetration of aluminium into the refractory material, the flux for example comprising a fluoride, a chloride or a borate, of at least one of lithium and sodium, or mixtures thereof. Such treatment favors aluminization of the refractory coating by the penetration therein of aluminium. Aluminization may also be assisted by including powdered aluminium in the slurry of micropyretic reactants with optional non-reactive fillers.

The substrate of the component may be coated outside the aluminium production cell and the coated component then inserted into the cell. Alternatively, the component is part of a cell which is coated in the cell prior to operation. For instance, the component is part of a cell bottom formed by an exposed area of carbonaceous material, an exposed area of refractory material, an exposed area of a metal alloy, or an expanse comprising exposed areas of carbonaceous material, refractory material and/or metal alloys. In this case, the slurry is preferably applied to the cell bottom in several layers with drying of each successive layer, and the micropyretic reaction is initiated by a mobile heat source. The micropyretic slurry preferably contains the particulate reactants in a colloidal carrier, e.g. comprising colloidal silica, colloidal yttria, and/or colloidal monoaluminium phosphate in various solvents. This colloidal carrier may be in an aqueous solvent but advantageously comprises an organic solvent, particularly an urethane-based solvent.

Particulate or fibrous non-reactant filler materials can be included by applying one or more layers from a slurry of particulate non-reactant filler materials or by including particulate or fibrous non-reactants in the micropyretic slurry.

The substrate may be carbonaceous in which case it may be made of anthracite based carbon or of graphite and other grades of carbon used in aluminium production cells. Advantageously, use may be made of the cheaper grades of carbon. Ceramic substrates include but are not limited to alumina and other materials that are not normally wettable by molten aluminium, such as aluminium nitride, aluminium oxynitride, boron nitride, silicon carbide, silicon nitride and aluminium boride. Other ceramics, cermets, metals such as copper and metallic alloys such as steel and cast iron or those of nickel, aluminium and copper can also serve successfully as substrates utilizing the present invention. The substrates may be bodies or tightly packed agglomerates. The substrates may have a microporous surface providing anchorage for the applied aluminium-wettable refractory material. Thus, sintered or tightly packed substrates may sometimes be preferred over highly dense materials such as solid blocks of fused alumina.

It is also possible, according to this invention, to apply the coating from a micropyretic slurry onto a skeletal substrate as taught in U.S. Pat. No. 4,600,481, to produce an adherent and permanent refractory aluminium-wettable coating throughout the skeletal substrate.

The substrate may consist of blocks that can be fitted together to form a cell bottom of an aluminium production cell, or packed particulate material forming a cell bottom. When a carbonaceous substrate is used, it will act to carry current to the cathodic pool if there is one, or to a thin layer of aluminium through the refractory coating in drained cells. When a refractory substrate is used, the aluminium-wettable refractory coating assists in maintaining a shallow pool of molten aluminium which needs to be only deep enough to permit good current distribution. In this case separate current conductors are provided through the refractory cell bottom for the supply of current, e.g. as disclosed in U.S. Pat. No. 5,071,533 with the possible improvement that the tops and sides of the current feeders may also be coated with refractory material as disclosed herein.

Steel, cast iron or other metallic alloy substrates, coated according to the invention with a refractory coating, can be used as cathodic current feeders extending through a refractory bottom of an aluminium production cell or can be coated with a refractory coating suitable for anodic applications.

The micropyretic slurry which is the precursor of the aluminium-wettable refractory coating may be applied in one or more layers directly to the substrate or onto a non-micropyretic sub-layer applied in one or more layers on the surface of the substrate.

The non-micropyretic sub-layer may be one or more coatings of a slurry of particulates of pre-formed materials compatible with the substrate and with the aluminium-wettable refractory coating. In particular, the sub-layer may contain pre-formed aluminium-wettable refractory material which is the same as that in the aluminium-wettable refractory coating, and it may also contain other refractory additives which may also be present in the aluminium-wettable refractory coating. Thus, the non-micropyretic under or bottom layer(s) may be produced by applying a slurry similar to the micropyretic slurry, except that it does not contain the micropyretic reactants.

The invention also concerns a component of an aluminium production cell which in use is subjected to exposure to molten electrolyte and/or to molten aluminium or corrosive fumes or gases, the component comprising a substrate of a carbonaceous, ceramic or metallic material, a cermet, or a compound coated with a refractory material comprising at least one boride, silicide, nitride, carbide phosphide, aluminide or oxide of at least one of titanium, zirconium, hafnium, vanadium, silicon, niobium, tantalum, nickel, molybdenum and iron or mixtures thereof, finely mixed with a refractory compound of at least one rare earth, in particular ceria or yttria, possibly together with other refractory oxycompounds such as alumina or oxides, nitrides, carbides, silicides, aluminides of at least one of the above-listed elements or silicon, as such or in colloidal form.

The preferred refractory coatings have the following attributes: excellent wettability by molten aluminium, excellent adherence to many different substrates, inertness to attack by molten aluminium and cryolite, low cost, environmentally safe, ability to absorb thermal and mechanical shocks without delamination from the anthracite-based carbon or other substrates, durability in the environment of an aluminium production cell, and ease of application and processing. The coatings furthermore have a controlled microporosity depending on the size of the particulate non-reactants as well as the thermal conditions during the micropyretic reaction along the combustion front.

When these refractory coatings are applied to a substrate, for instance of graphite or anthracite-based carbon, refractory material or steel used in an aluminium production cell in contact with the molten electrolyte and/or with molten aluminium, the coating protects the substrate against the ingress of cryolite and sodium and is in turn protected by the protective film of aluminium on the coating itself.

The invention also relates to an aluminium production cell comprising a coated component as discussed above as well as a method of producing aluminium using such cells and methods of servicing and/or operating the cells.

A method of operating the cells comprises:

producing a cell component which comprises a substrate of carbonaceous or refractory material or a metallic alloy and a protective coating of refractory material, by applying to the substrate a micropyretic reaction layer from a slurry containing particulate reactants preferably in a colloidal carrier, and initiating a micropyretic reaction;

if the micropyretic reaction is initiated and its preparation completed outside the cell, placing the coated component in the cell so the coating of refractory material will be contacted by the cathodically produced aluminium, and/or the molten electrolyte, and/or the anodically-released gases; and operating the cell with the coating protecting the substrate from attack by the cathodically-produced aluminium, by the molten electrolyte and by the anodically-released gases with which it is in contact.

The component may be a current-carrying component made of metal, metal alloy, or an intermetallic compound, for example a cathode, a cathode current feeder, an anode or an anode current feeder. Or the component may be a bipolar electrode coated on its cathode face, or on its anode face, or both.

In operation of the cell the component may be exposed to corrosive or oxidising gas released in operation or present in the cell operating conditions, such component comprising a substrate of carbonaceous material, refractory material or metal alloy that is subject to attack by the corrosive or oxidising gas and a coating of refractory material protecting it from corrosion or oxidation.

It is advantageous for the component to have a substrate of low-density carbon protected by the refractory material, for example if the component is exposed to oxidising gas released in operation of the cell, or also when the substrate is part of a cell bottom. Low density carbon embraces various types of relatively inexpensive forms of carbon which are relatively porous and very conductive, but hitherto could not be used successfully in the environment of aluminium production cells on account of the fact that they were subject to excessive corrosion or oxidation. Now it is possible by coating these low density carbons according to the invention, to make use of them in these cells+instead of the more expensive high density anthracite and graphite, taking advantage of their excellent conductivity and low cost.

The component advantageously forms part of a cathode through which the electrolysis current flows, the refractory coating forming a cathodic surface in contact with the cathodically-produced aluminium. For example, it is part of a drained cathode, the refractory coating forming the cathodic surface on which the aluminium is deposited cathodically, and the component being arranged usually upright or at a slope for the aluminium to drain from the cathodic surface.

Operation of the cell is advantageously in a low temperature process, with the molten halide electrolyte containing dissolved alumina at a temperature below 900° C., usually at a temperature from 680° C. to 880° C. The low temperature electrolyte may be a fluoride melt, a mixed fluoride-chloride melt or a chloride melt.

This low temperature process is operated at low current densities on account of the low alumina solubility. This necessitates the use of large anodes and corresponding large cathodes, exposing large areas of these materials to the corrosive conditions in the cell, such large exposed areas being well protected by the refractory coatings according to the invention which are just as advantageous at these lower temperatures.

The refractory coatings find many applications on account of their excellent resistance, protection, and stability when exposed to the corrosive action of liquids and fumes existing in the cell or formed during electrolysis even when the temperature of operation is low as in the Low Temperature electrolysis process for the production of aluminium (see for example U.S. Pat. No. 4,681,671).

Micropyretic Reactions

The invention is based on the use of a micropyretic slurry, which when ignited starts a micropyretic reaction.

Micropyretic reactions are already known. A micropyretic reaction is a sustained reaction with formation of condensed matter, starting with finely divided particulate reactants which during the reaction are in solid state or in suspension in a liquid. The combustion takes place without a gaseous reactant and usually without gaseous reaction products. The reactants are most often in elemental form, but may be compounds, eg. nitrides, when nitrides are desired in the reaction products. Micropyretic reactions are exothermic and can be initiated in a point or zone ignited by bringing the reactants to the reaction temperature. In micropyretic reactions, ignition starts a sustained reaction with formation of the condensed matter, this sustained reaction proceeding along a combustion front whose propagation can be controlled by choice of the reactants, the non-reactants or fillers and the carriers, which are the liquid portion of the slurry. Such reactions are self-propagating and are sometimes known in the literature as combustion synthesis (CS) or self-propagating high-temperature synthesis (SHS). Two modes of micropyretic heating reaction are recognized. One where heating is at one point and propagation is very apparent (called the self-propagating mode), the other where propagation needs assistance (called the thermal explosion mode).

Almost all known ceramic materials can be produced by combustion synthesis, but not necessarily without unwanted impurities. It has been pointed out that considerable research is needed and that major difficulties are encountered in achieving high product density and adequate control over the reaction products (see for example H. C. Yi et al in *Journal Materials Science*, 25, 1159–1168 (1990)).

SHS techniques using pressed powder mixtures of titanium and boron; titanium, boron and titanium boride; and titanium and boron carbide have also been described (see J. W. McCauley et al, in *Ceramic Engineering and Science Proceedings*, 3, 538–554 (1982)).

Reactions using titanium powders to produce TiC, $TiB_2$ or $TiC+TiB_2$ have also been studied. The compact density of the reactant powder was found to be a major factor in the rate of reaction propagation (see R. W. Rice et al, *Ceramic Engineering and Science Proceedings*, 7, 737–749, (1986)).

U.S. Pat. No. 4,909,842 discloses the production by SHS of dense, fine-grained composite materials comprising ceramic and metallic phases, by the application of mechanical pressure during or immediately after the SHS reaction. The ceramic phase of phases may be carbides or borides of titanium, zirconium, hafnium, tantalum or niobium, silicon carbide, or boron carbide. Intermetallic phases may be aluminides of nickel, titanium or copper, titanium nickelides, titanium ferrides, or cobalt titanides. Metallic phases may include aluminium, copper, nickel, iron or cobalt. By applying pressure during firing, the final product of ceramic grains in an intermetallic and/or metallic matrix had a density of about 95% of the theoretical density.

Known micropyretic reactions by CS or SHS are not without drawbacks and are inadequate to produce adherent refractory coatings on carbonaceous, refractory or other substrates, in particular for use as cell components in aluminium production, which the invention has succeeded in producing, starting from micropyretic slurries of special composition as described herein.

The application of micropyretic reactions to produce net-shaped electrodes for electrochemical processes, in particular for aluminium production, is the subject of co-pending U.S. patent applications Ser. No. 07/648,165 and Ser. No. 07/715,547, the contents of which are incorporated herein by way of reference. In said applications, a mixture of particulate or fibrous combustion synthesis reactants with particulate or fibrous filler materials and a particulate or fibrous, non-reactant, inorganic binder is used to produce a bulk electrode by combustion synthesis.

The present invention provides unexpectedly good results by using a novel micropyretic slurry of particulate reactants possibly with particulate or fibrous diluents and non-reactant filler materials which is advantageously applied to a carbonaceous, refractory or metallic substrate before initiating the reaction. This slurry when ignited starts a self-sustaining reaction, along a combustion front, to produce the refractory material, the components of the slurry and the refractory material produced forming condensed matter along the combustion front as the reaction proceeds. The produced refractory material is usually selected from the group of borides, silicides, nitrides, carbides, phosphides, aluminides or oxides, and mixtures thereof, of at least one metal selected from titanium, zirconium, hafnium, vanadium, silicon, niobium and tantalum, nickel, molybdenum, chromium and iron, as well as metal alloys, intermetallic compounds, cermets or other composite materials based on said metal or mixtures thereof or mixtures with at least one of the aforesaid compounds. The refractory borides of titanium, zirconium, hafnium, vanadium, niobium and tantalum, or combinations thereof with the other listed materials are preferred.

The Micropyretic Slurry

The micropyretic slurry comprises particulate micropyretic reactants in combination with optional particulate of fibrous non-reactant fillers or moderators in a carrier of colloidal materials or other fluids such as water or other aqueous solutions, organic carriers such as acetone, urethanes, etc., or inorganic carriers such as colloidal metal oxides.

The colloidal carrier—usually colloidal alumina, colloidal silica, colloidal yttria or colloidal monoaluminium phosphate and usually in an aqueous medium—has been found to assist in moderating the reaction and considerably improve the properties of the coating. It is however not necessary for all of the applied layers of the slurry to have a colloidal carrier. Excellent results have been obtained using some slurries with a colloidal carrier and others with an organic solvent. Combinations of a colloidal carrier in aqueous medium and an organic solvent have also worked well.

The micropyretic combustibles may comprise components to produce, upon reaction, borides, silicides, nitrides and aluminides, and mixtures thereof, of titanium, zirconium, hafnium, vanadium, silicon, niobium and tantalum, nickel, molybdenum, chromium and iron. Mostly, these reactants will be in the elemental form, but may also be compounds, for example for the production of nitrides. The reactants are preferably finely divided particulates comprising elements making up the aluminium-wettable refractory material produced. The reactants are preferably in the stoichiometric proportions necessary to produce the desired end products without leaving any residual reactants.

Titanium diboride will henceforth be described by way of example as the final material, starting from elemental particulate titanium and boron in equimolar proportions in the micropyretic reaction slurry. It will readily be understood that other refractory compounds and mixtures can be produced in similar manners by using the appropriate starting reactants and adjusting the parameters of the production process.

The micropyretic reaction slurry may also comprise non-reactant fillers such as pre-formed particulates or fibers of the desired refractory material being produced, for instance, pre-formed particulate titanium diboride together with elemental titanium and boron. Other inert fillers which may be desirable to moderate the micropyretic reaction and/or to enhance the properties of the end product may also be included.

Such fillers thus are advantageously included in combination with colloids in a liquid carrier for the reactants, such as colloidal alumina, colloidal yttria, colloidal ceria, colloidal phosphates in particular colloidal monoaluminium phosphate, or colloidal silica. More generally, colloids of other elements may be included, alone or in combination. These products do not take part in the reaction, but serve as moderators, and contribute to the desired properties of the end product. All of these colloids act as carriers for the particulate micropyretic combustible slurry or for the non-reactant slurry.

The solvent of the carrier for the reactant or non-reactant slurry may be an organic solvent in particular a urethane-based solvent such as polyurethane, acetone but also water or aqueous solutions, possibly together with monoaluminium phosphate.

Other organic solvents, especially for use in combination with colloids include isopropanol, ethyleneglycol, dimethylacetonide and mono-n-propylether.

The use of organic solvents which are carbonised during the micropyretic reaction can be particularly advantageous on carbonaceous substrates, e.g. due to the formation of glassy or vitreous carbon which assists bonding of the coating to the carbonaceous substrate. Organic materials suitable for producing glassy carbon include polyurethane/furan resins, polyacrylonitrile, cellulose pitch, vinyl alcohol, thermosetting resins, etc. Other usable polymers include polyacrylamide and other derivatives of polyacrylic acid, soluble aromatic polymers such as aromatic polyamides, aromatic polyesters, polysulfanes, aromatic polysulfides, epoxy, phenoxy or alkyde resins containing aromatic building blocks, polyphenylene or polyphenylene oxides. Heteroaromatic polymers such as polyvinylpyridine, polyvinylpyrrolidone or polytetrahydrofurane can also be used as well as prepolymers convertible to heteroaromatic polymers, for instance polybenzoyazotes or polybenzimidazopyrrolones. Polymers containing adamantane, especially the above-mentioned prepolymers containing adamantane units, may also be used. For instance, polybenzimidazopyrrolidone (pyrrone) and adamantane based polybenzoxyzote (PBO) can be used in a solution of N-methyl pyrrolidone. Such polymers are pyrolised during the micropyretic reaction to form semiconductive polymers and/or glassy forms of carbon, which adhere especially well to carbonaceous substrates although excellent results may be obtained too on other substrates such as ceramic or metallic.

Surprisingly, when using organic solvents, superior results have been obtained when the slurry with the organic solvent is applied on top of one or more underlayers of a slurry with a non-organic solvent, usually one containing a colloidal carrier.

The components of the slurry thus consist of the particulate reactants, optional particulate or fibrous fillers and the carrier which is usually a colloidal carrier and which may, e.g. as in the case of monoaluminium phosphate and organic carriers, be transformed or react during the micropyretic reaction.

The particulates usually have a maximum dimension not exceeding about 100 micrometers, more often 50 microns or less. The fillers can be particulates of similar dimensions, or may be fibrous in which case they may be larger than 100 microns.

The colloids are submicronic; their particles are of the order of a nanometer.

It has been found that when well-chosen slurries are ignited after drying, a controlled micropyretic sustained reaction takes place to produce an intimate mixture of the resulting reaction product with the fillers and the carriers, e.g. titanium diboride or other refractory compounds with desirable quantities of aluminium, ceria, yttria, alumina, silica or other materials including glassy carbon or other forms of carbon which do not detract from the wettability of the material by molten aluminium, but usually improve the adherence and the protection. Such materials are particularly advantageous when formed as coatings on a carbonaceous or ceramic substrate, though, as mentioned, adherent, protective coatings can be applied also to metallic substrates.

Production by Micropyretic Reaction

The production of a refractory material as a coating on carbonaceous, ceramic, metallic or other substrates involves the application of the micropyretic slurry of particulate reactants, particularly in a colloidal carrier, alone or along with particulate or fibrous fillers, directly on the substrate or onto a non-reactive sub-layer or sub-layers devoid of particulate micropyretic reactants but which may include a pre-formed particulate of the refractory material being produced and/or other particulate or fibrous non-reactants. The sub-layer(s) is/are preferably also applied with its or their particulates suspended in a colloidal carrier in an aqueous or organic solvent.

The reactant coating may be formed by applying one or more layers of the micropyretic slurry each from about 50 to 1000 micrometers thick, each coating being followed by drying before applying the next layer. The same applies to the sub-layer which can be built up by applying successive coatings, each followed by an at least partial drying. Application in multiple layers improves the strength of the coating after drying and before combustion (the so-called green strength), and this leads to better properties in the end product including uniform, controlled pore size and distribution and greater imperviousness.

These layers can be formed by any convenient technique including painting, dipping, spraying and slip-casting. The drying can be carried out by air drying at ambient temperature or above, or by pre-heating the substrate, and possibly in an atmosphere with controlled humidity.

It is also possible to apply successive layers of the slurry containing the particulate reactants, possibly mixed with particulate or fibrous non-reactants, and layers of the slurry containing the particulates or fibrous non-reactants in a multilayer sandwich. Preferably, a reactant layer will be on top, but it is also possible to top-coat with slurries containing pre-formed refractory material.

When all of the layers have been applied, it is important to allow the coatings to dry for a prolonged period to provide coatings without cracks and with adequate green strength and to eliminate water and/or other low boiling point solvents. This full drying may take place in air for several hours to several days, depending mainly on the temperature and the humidity of the air and on the total thickness of the coatings which may range from about 100 micrometers to about 3000 micrometers and more.

The combustion reaction can then be initiated by wave propagation or by a thermal explosion mode. In the wave propagation mode, the reaction is started from one part of the completed green coating and propagates through the entire green surface. It may be advantageous to heat the surface of the coating to a preheat temperature for instance from between 200° C. and 500° C. In the thermal explosion mode, the reaction is started by heating the entire surface of the coating and possibly the substrate to the required temperature to initiate the combustion reaction at all locations in the coating.

Usually the wave propagation mode is more practical. This uses a torch, laser, plasma, the passage of electric current, or any other suitable mobile heat source to initiate the micropyretic reaction and to help sustain the reaction if necessary, or that can be moved over the coating at a desired scanning rate to progressively initiate the reaction over the coating as the heat source passes by. The thermal explosion mode can employ an induction furnace or other conventional means such as another type of furnace or radiant heater, and this may give better control of the reaction leading to more homogeneous properties.

The ignition temperature is usually in the range 500°–2000° C., depending on the reactants. Combustion may be preceded by preheating for an adequate time, about 10–60 seconds in some cases and an hour or more in others.

The micropyretic reaction may take place in air but advantageously takes place in a reducing atmosphere containing, for example, $CO_2$.

In the case of the wave propagation mode, combustion progresses along a front parallel to the surface of the substrate being coated. The temperature reaches a peak at the combustion front. Ahead of the combustion front, the uncombusted part of the reactants is at a relatively low temperature. Behind the combustion front, the temperature drops gradually.

In the thermal explosion mode, the combustion reaction is started at all locations of the coating, and progresses rapidly in depth through the coating.

The finished material obtained utilizing slurries of well chosen composition and methods according to the invention adheres perfectly to the substrate, due to the controlled progression of the reaction front during the micropyretic reaction and the choice of the first layer(s) of the slurry.

Particularly for carbonaceous substrates, it is advantageous for at least the bottom layer or the adjacent under layer(s) of the slurry coating to have an organic carrier which, when subjected to the heat treatment during the micropyretic reaction, is pyrolyzed to carbon bonding the resultant coating to the substrate.

For alumina and other ceramic or metallic substrates, excellent adhesion of the coating is obtained in a similar manner, since the coatings penetrate into pores on the surface or between particles of the substrate and become anchored therein.

BRIEF DESCRIPTION OF THE DRAWINGS

The invention will now be described with reference to the application of coatings to components of electrolytic cells for the production of aluminium, especially for novel designs of these cells, as illustrated in the accompanying drawings, wherein:

FIG. 4 schematically shows an aluminium production cell in which carbon cathodes with inclined upper faces and coated according to the invention have been secured on the cell bottom and cooperate with inclined anodes;

FIG. 6 is a schematic representation illustrating the wave propagation mode of a micropyretic reaction.

DETAILED DESCRIPTION

Figure 1:
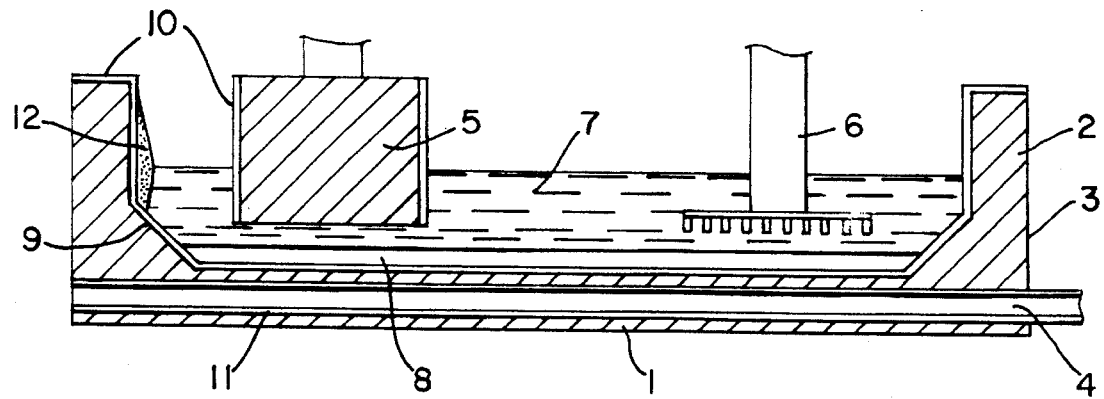
FIG. 1 schematically shows an aluminium production cell with a carbon bottom and lower cell wall lining coated in accordance with the invention.

FIG. 1 schematically shows a Hall-Héroult aluminium production cell of conventional design that has been modified by providing the cell bottom with a coating of refractory aluminium-wettable material in accordance with the invention, the upper part of the cell wall with a coating 10 resisting oxidation and the lower part with a coating 9 particularly resistant to cryolite. The cell comprises a cell bottom 1 and side walls 2 of carbon enclosed in a steel lining 3. The cell bottom 1 and side walls 2 are made of blocks of anthracite-based carbon packed together and bonded by a carbon-based ramming paste. Through the bottom 1 extend steel current feeder bars 4 connected externally to a negative bus bar. To protect the cathode current feeder bars 4 from aluminium, an aluminium-resistant coating 11 is applied on their surfaces in accordance with the invention.

Several anodes 5, conventionally blocks of pre-baked carbon, are suspended in the cell by the usual mechanisms (not shown) enabling their height to be adjusted. Oxygen evolving non-carbon anodes 6 may be suspended in the cell instead of the carbon anodes 5 but do not need to be vertically adjustable because they are non-consumable. The anodes 5 and 6 dip in a molten electrolyte 7, usually a cryolite-based melt containing dissolved alumina, and which floats above a pool or thin layer 8 of molten aluminium on the cell bottom. In operation, the cryolite-based electrolyte 7 is usually at a temperature of about 950° C., but the invention applies also to components used in cells with electrolytes well below 900° C., and as low as 700° C.

According to the invention, the top surface of the carbon cell bottom 1, i.e. the entire flat top surface and at least the lower parts of the inclined side walls liable to be exposed to the molten aluminium 8, is coated with an adherent coating 9 of an aluminium-wettable refractory material, preferably a titanium diboride based material containing additives such as alumina, ceria, yttria and/or silica. This coating 9 can extend to just above the maximum level of the aluminium 8, all the way up the side walls, or up to the crust 12 of solidified electrolyte, if there is one, if required, a different coating can be used to protect the carbon from attack by the cryolite, and a yet different coating 10 can be provided on the upper part of the side walls to protect the carbon from oxidation and the fluoride fumes.

The presence of the aluminium-wettable coating 9 means that the cell can be operated with a relatively shallow layer 8 of molten aluminium and the anodes 5 or 6 can be held with a small and constant gap of about 20–30 mm above the aluminium layer 8. This reduced anode-cathode distance leads to a substantial reduction in the voltage drop through electrolyte 7, and less heat dissipation during operation. It may thus be possible to operate the cell without the usual crust of solidified electrolyte around the periphery (especially when non-consumable anodes 6 are used) or at least with a much smaller crust, indicated by 12.

The aluminium-wettable coating 9 can be applied directly to a new, unused or re-built cell bottom 1, or can be applied to a used cell bottom 1 after emptying the cell of its molten contents for servicing, and machining the top surface of the cell bottom 1 to remove damaged or reacted parts and generally to renew the exposed surface.

To produce the aluminium-wettable coating 9 and the other coatings 10 and 11, several layers of primary non-micropyretic slurries and/or micropyretic slurries with appropriate reactants and preferably with fillers, as hereinbefore or as hereinafter described in detail, are applied for instance by brushing the reactive slurries directly onto the surface or onto one or more under coatings of a non-reactive slurry, with drying between the application of successive layers. After final prolonged drying, and preferably after warming up the entire surface or that part of the surface just before the ignition front, the dried micropyretic reaction slurry is ignited, in this case, by the wave propagation mode by an acetylene torch, or any other suitable heat source. This starts a self-propagating ignition front at a large, heated part of the surface. If necessary, an additional mobile heat source may be used to sustain the micropyretic reaction, along the mentioned propagating ignition front.

After formation of the aluminium-wettable coating 9, to avoid a big thermic shock to the cell bottom 1, it is preferable not to let the temperature of the cell bottom cool down too abruptly to the operating temperature (usually around 950° C., but advantageously sometimes in the region of 680°–880° C.), or much below the operating temperature. Nevertheless, cooling possibly to several hundreds of degrees centigrade below cell operating temperature, and if necessary even below the melting point of aluminium (660° C.), is feasible without damaging the coating. The cell can then be started with one of the usual methods by filling with electrolyte and aluminium and raising the temperature to the operating temperature, e.g. by the usual means of passing current from the anodes 5 or 6 to the cell bottom 1 with an adequate anode-cathode distance.

The excellent and permanent wetting of the carbon cell bottom 1 by the aluminium-wettable coating 9 means that: during operation the cell bottom 1 is protected against unwanted reactions with components of the electrolyte 7, the cell can operate with a drained cathode, the anode-cathode gap can be decreased, and no sludge or muck can come to settle between the aluminium layer 8 and the cell bottom 1. The operating efficiency is thus enhanced, the energy consumption decreased, the useful lifetime of the cell bottom is extended and there is considerably less toxic material to be disposed of when the cell bottom must be serviced. As a result, aluminium can be produced in a cell coated according to the invention at substantially lower cost than in a non-coated cell of the prior art.

Figure 2:
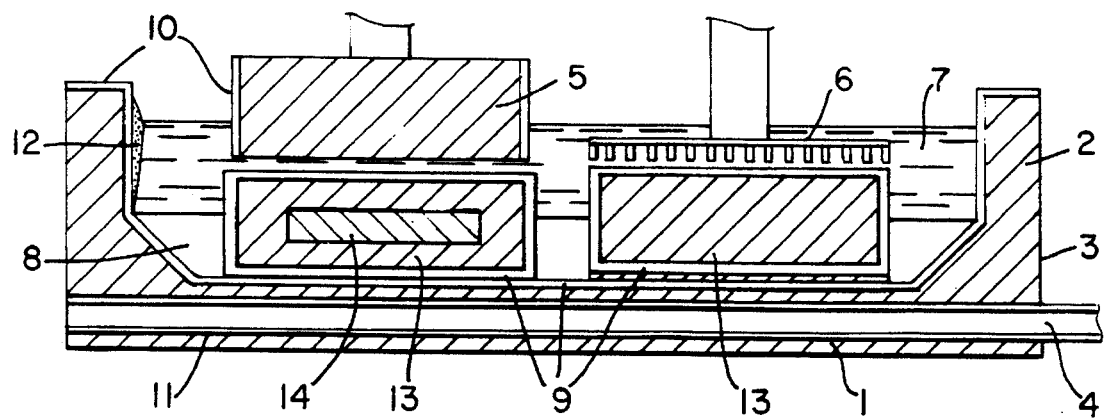
FIG. 2 schematically shows another aluminium production cell in which coated carbon cathode bodies according to the invention have been placed on the cell bottom in a pool of molten aluminium.

The cell shown in FIG. 2 has a carbon cell bottom 1 and side walls 2 enclosed in a steel shell 3, and cathode current feeders 4 in the cell bottom 1, as in FIG. 1. On the carbon cell bottom 1, the cell of FIG. 2 is fitted with blocks 13 of pre-baked carbon whose entire external surfaces are coated with the aluminium-wettable coating 9. As illustrated in the left hand part of FIG. 2, these blocks 13 may have internal inserts 14 of cast iron or another heavy material which acts as ballast so that the blocks 13 sink in the electrolyte 7 and in the aluminium layer 8, and rest firmly on cell bottom 1.

Or, as illustrated in the right hand part of FIG. 2, the blocks 13 may be secured to the cell bottom by any convenient means, such as by reaction bonding or by mechanical means.

In use, the anodes 5 or 6 are suspended with their flat lower faces facing the corresponding upper flat surfaces of the aluminium-wettable coating 9 on blocks 13, with a relatively small and constant anode-cathode gap of about 25–35 mm. The upper flat surface of the aluminium-wettable coating 9 acts as a drained cathode, from which a film of cathodically produced aluminium is constantly drained into the pool 8 of molten aluminium. The level of pool 8 may fluctuate from close to the cell bottom 1 up to adjacent the upper flat surfaces of the aluminium-wettable coating 9 of blocks 13, whereby the product aluminium may be tapped off periodically in the usual way.

The blocks 13 may have any convenient height depending on the desired operating configuration, in particular so that the anodes 5 or 6 can be maintained close to the minimum height that they would have in conventional operation, i.e. before the blocks 13 were fitted. For instance, the height of the blocks 13 may be from 150–300 mm.

It is also possible to suspend the blocks 13 from the anodes 5 or 6 by attachments made of non-electrically conductive materials that are resistant to the electrolyte, for example aluminium nitride or nickel sub-oxides or alumina when the cell is operated at low temperature, which attachments also serve as spacers maintaining the desired small anode gap. In this way, the cathode blocks 13 can be removed from the cell with the anodes 5 or 6 for periodic servicing or replacement.

As a modification of the embodiment of FIG. 2, the pool 8 of molten aluminium could contain a packed or loose bed of pieces of refractory material, or pieces of carbon with internal ballast, or skeletal bodies, whose surfaces are coated with a permanent aluminium-wettable coating 9 in accordance with the invention. Such pieces, which may be of random shapes or regular shapes such as rings, form a bed which inhibits wave motion in the molten aluminium pool 8 and thereby enables operation with a reduced anode-cathode distance, as explained in U.S. Pat. No. 4,552,630.

Figure 3:
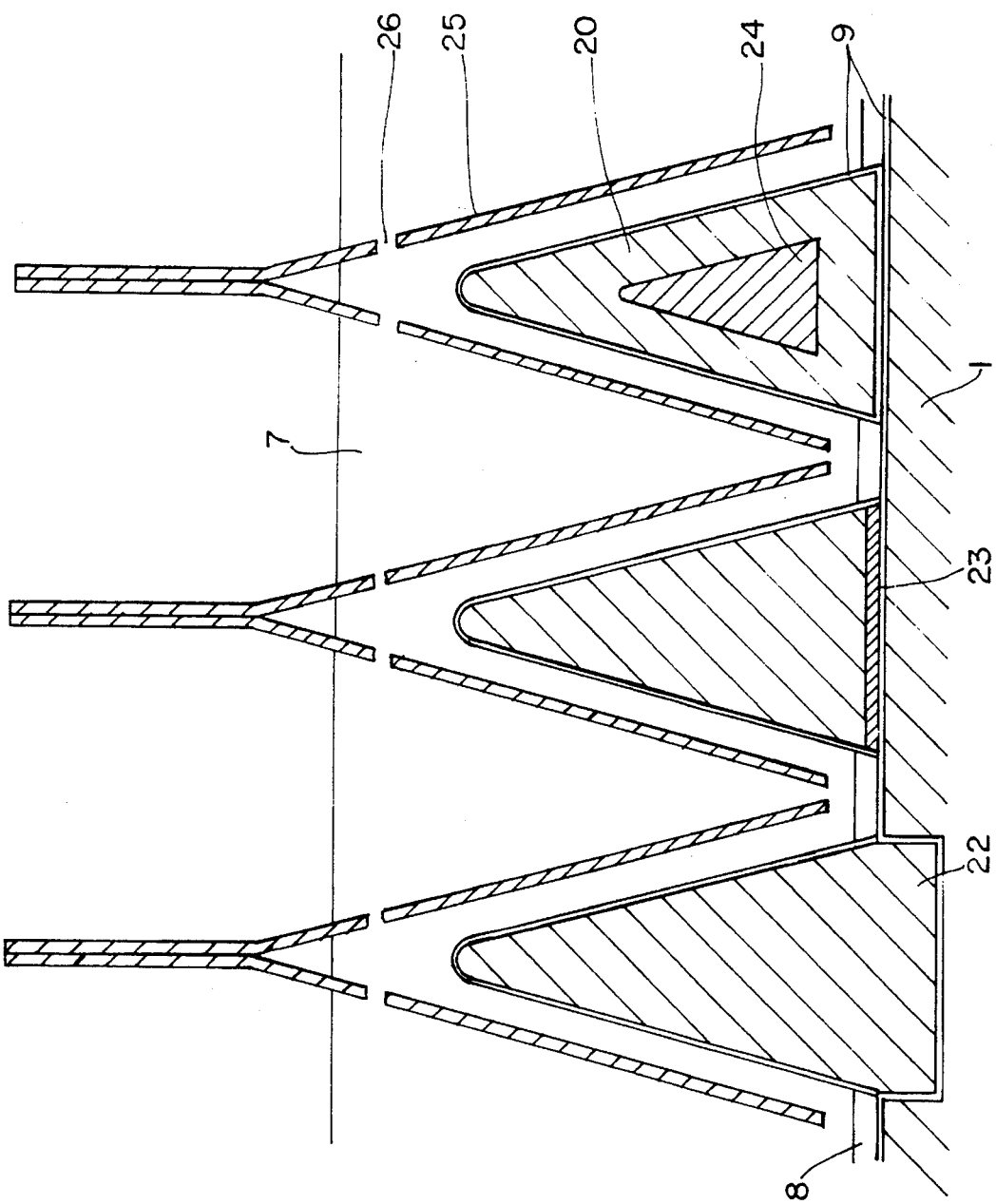
FIG. 3 schematically shows a novel aluminium production cell in which carbon cathode bodies having a wedge form and coated according to the invention have been secured on the cell bottom, and cooperate with inclined anodes.

FIG. 3 shows another anode-cathode configuration which can be fitted in a conventional aluminium production cell like that of FIG. 1, or in a cell of completely new design.

In this design, carbon prisms or wedges 20 are fitted on a carbon cell bottom 1, for instance by having bottom parts 22 embedded in the cell bottom, by being bonded by a layer 23 to the cell bottom when the cell is being built or reconstructed, or by having internal ballast 24, for instance of cast iron, which holds them on the cell bottom. These carbon wedges 20 have inclined side faces, for instance at an angle of about 45° to 10° to the vertical, meeting along a rounded top edge 21. The wedges 20 are placed side by side, spaced apart at their bottoms to allow for a shallow layer 8 of aluminium on the cell bottom 1. The cell bottom 1 can be coated with a protective aluminium-wettable coating 9 according to the invention. The edges 21 are all parallel to one another across or along the cell, and the tops of the prisms remain several centimeters below the top level of the electrolyte 7.

The inclined side faces of wedges 20, and possibly also the bottom face, are coated with a permanent aluminium-wettable coating 9 in accordance with the invention. These coatings 9, like that of the cell bottom 1, are applied from a micropyretic slurry as before. The reaction mixture can be ignited by wave propagation for the cell bottom 8 or by the thermal explosion mode for the wedges when these are suitably dimensioned so they can be coated before installing them into the cell. In use, these coatings 9 on the sloping surfaces of wedges 20 form drained cathode surfaces from which cathodically produced aluminium drains permanently into the pool 8. Current is supplied to the wedges 20 via conductor bars (not shown, but like the bars 4 of FIG. 1) in the cell bottom 1.

Over the cathode-forming wedges 20 are fitted anodes 25, each formed by a pair of plates which fit like a roof over the wedges 20, parallel to the inclined surfaces of wedges 20 with a small anode-cathode distance of about 15–20 mm. At their tops, the pairs of anode plates 25 are joined together and connected to a positive current supply. The anode plates 25 have openings 26, for example adjacent the top of their inclined faces, for the escape of anodically-generated gas, usually oxygen. The anode plates 25 are made of or coated with any suitable non-consumable or substantially non-consumable electronically-conductive material resistant to the electrolyte and to the anode product of electrolysis, which in the case of the electrolysis of alumina utilizing non-carbon anodes, is oxygen. For example, the plates may have a metal, alloy or cermet substrate which is protected in use by a metal oxide layer and a cerium-oxyfluoride-based protective coating produced and/or maintained by maintaining a concentration of cerium in the electrolyte, as described in U.S. Pat. No. 4,614,569.

Alternatively, it is possible to employ consumable carbon anodes with wedge-shaped bottoms which dip between the cathode wedges 20, the anodes having inclined, consumable operative surfaces facing the inclined surfaces of two adjacent cathode-forming wedges 20, which are maintained with a substantially constant anode-cathode distance by lowering the anodes at a rate to compensate for their consumption.

These designs employing wedge-shaped cathodes have several advantages. As before, the permanent aluminium-wettable refractory surfaces on the cathodes protect the carbon from attack and the cell can be operated with a small anode-cathode distance ensuring efficient operation. In addition, the design permits a very high productivity per unit area of the cell floor, possibly 1.5 to 2.5 times as much as in a conventional cell.

It is also possible to use pieces of carbon or refractory materials, coated in accordance with the invention with a permanent aluminium-wettable refractory surface, as other components in aluminium production cells in particular components which in use are exposed to molten aluminium, for instance weirs or baffles, side walls etc., or as components in other molten salt electrolysis cells.

FIG. 4 shows a modification of the cell of the preceding Figures wherein cathode blocks 13 fixed on the cell bottom 1 have inclined upper faces coated with the aluminium-wettable refractory coating 9. The left-hand part of FIG. 4 shows blocks 13 with V-shaped faces 27 inclined down towards a central groove 28 in which the product aluminium collects. This groove 28 can be slightly inclined towards one end to facilitate the flow of molten aluminium into pool 8. Above the V-shaped surfaces 27 of blocks 13 are anodes 5 whose bottom surfaces have corresponding V-shaped surfaces, facing the surfaces 27 with a constant anode-cathode gap.

The right hand side of FIG. 4 shows cathode blocks 13 coated with the aluminium-wettable coating 9, these blocks having top surfaces 29 inclined to one side, and the anodes 5 have each a corresponding sloping lower face. In these embodiments, the sloping surfaces of the anodes 5 considerably improve gas release compared to conventional prebaked anodes with a flat bottom. The improved gas release contributes to a better circulation of the electrolyte 7 and helps reduce the voltage across the cell.

Figure 5:
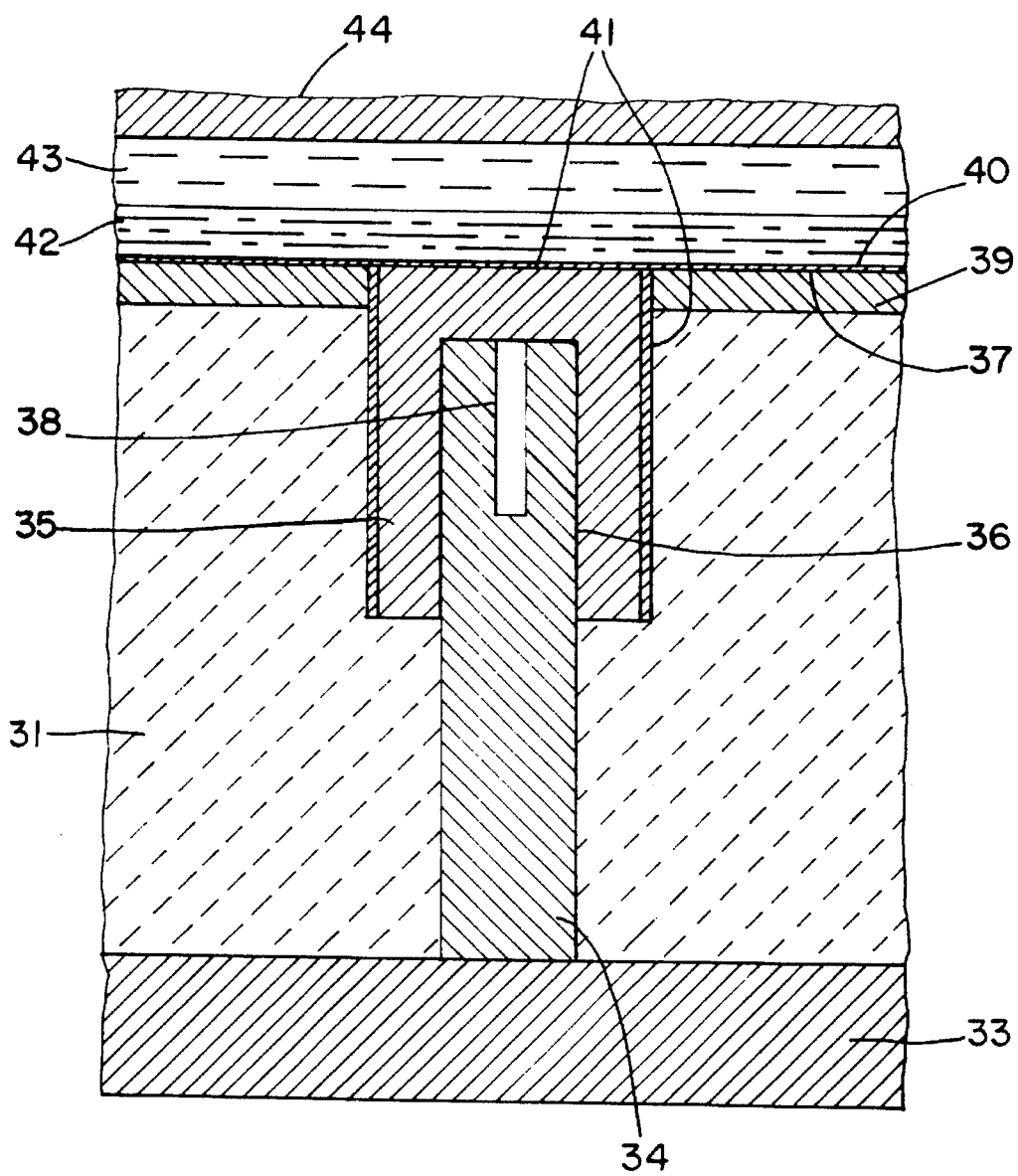
FIG. 5 is a sectional longitudinal view through part of an aluminium production cell having a coated carbon current collector in a coated refractory cell bottom.

FIG. 5 is a schematic representation of part of an aluminium reduction cell having a non-conductive cell bottom with a special bottom-entry current feeder arrangement.

The non-conductive cell bottom comprises an alumina potlining 31 contained in a steel shell 33 which is connected to external buswork. Extending vertically from the bottom of shell 33 at spaced locations are a number of steel posts 34 which terminate just below the top of potlining 31. At its top end, each post 34 is enclosed in a cap 35 of carbon. As shown in FIG. 1, the cap 35 consists of a cylindrical body having a central bore 36 and a closed upper end 37. The post 34 fits loosely in the bore 36 and is secured therein by pouring in cast iron or conductive pitch by the well known rodding process, or by force fitting. Conveniently, the caps 35 are secured to the posts 34 which may then be welded to the bottom of shell 33. To allow for thermal expansion, the top end of post 34 has one or more slots 38. The circular top end 37 of cap 35 lies flush with a top layer 39 of the potlining 31. This top layer 39 may be tamped tabular alumina and is coated with a layer 40 aluminium-wettable refractory material for instance including $TiB_2$ produced according to the invention. Likewise, the top upper end 37 and the sides of the carbon cap 35 are coated with a layer 41 of aluminium-wettable refractory material, for instance including $TiB_2$ produced according to the invention. Maximum advantages are obtained when both the layer 40 of refractory material and the top of carbon cap 35 are both coated eg. with $TiB_2$. These coatings can be applied separately or together by applying a coating over the entire cell bottom including the carbon areas 37. However, the invention also forsees the possibility that only one of the refractory or carbon surfaces may be coated. By extending the coating 41 down the sides of the carbon cap 35, maximum protection against attack by aluminium or cryolite is obtained.

Atop the aluminium-wettable layers 40 and 41 is a layer of cathodic molten aluminium 42, which may be about 1–4 cm thick for an aluminium-wettable cell bottom surface. Above the cathodic aluminium 10 is a layer of electrolyte 43, typically molten cryolite containing dissolved alumina at a concentration well below saturation, into which anodes 44 dip. In operation, the electrolyte 43 may be at a temperature of about 900° C. or below.

The anodes 44 may be conventional prebaked carbon anodes (especially for deep pool operation) or oxygen-evolving non-consumable anodes (for shallow or deep pool operation). Preferred non-consumable anodes have an electrically conductive substrate coated with a protective surface layer based on cerium oxide-fluoride. Such surface layers can be preserved by including a concentration of cerium in the electrolyte 43, as mentioned beforehand and as described in U.S. Pat. No. 4,614,569.

The described embodiment corresponds to the retrofitting of an existing type of cell with a steel shell bottom 33, used for supplying current. Of course, an alumina-filled potlining can be employed with different cell base designs, for example having a solid aluminium base plate to which posts 34 of a suitable high-temperature aluminium alloy are welded. Such alloys should have a fusion point of about 1000° C. or in any event above the cell operating temperature.

Instead of being a cylindrical cap, the protective carbon member can advantageously be a slab or bar having a flat top face which extends across the cell. A slot can be provided in such a bar to receive a plate-like current-collector core. Alternatively, there can be several bores in the carbon to receive several current collector posts of corresponding shape. Also, especially for larger carbon current feeder posts or bars, it may be possible to dispense with the inner steel current supply bar.

The coating 9 of the aluminium-wettable refractory material can also be applied to the surface of a steel current feeder which can be made to extend upwardly to contact the aluminium pool, through a protective, refractory lining. The steel current feeders can be posts whose top ends extend to openings in the cell bottom, or posts having at their top ends bars extending across the cell bottom.

The current feeders can also be made entirely of carbon cylinders or slabs embedded in carbon blocks from which cathode conductor bars extend to external negative busbars.

The coating 9 of the aluminium-wettable refractory material can also be used in other cell designs, for example where drained cathodes have vertical surfaces or are sloping at a small angle to vertical.

The invention will be further described in the following examples.

EXAMPLE 1

Several anthracite-based samples were coated with adherent $TiB_2$ layers as follows.

Reactant powders of elemental titanium (99.5% pure) and boron (92% pure), both −325 mesh (<42 micrometers) in equimolar proportions were mechanically blended for 15 minutes and, by adding various proportions of a carrier, were formed into a slurry. The carrier was 0–50% by volume of colloidal silica and 100–50% by volume of monoaluminium phosphate $(Al(H_2PO_4)_3)$. The powder/carrier ratio was varied from 1 g/ml to 2 g/ml. The slurry was applied to the anthracite samples in several layers, by dip coating or brushing with drying for 15–30 minutes after the application of each layer, and a final drying for a period of up to a day or more after application of the last layer. The applied coating thickness was 0.5 to 1 mm. After final drying, the slurry-deposited compositions were ignited using an oxy-acetylene torch.

It was found that the optimum composition was around 25–40% of colloidal silica and 75–60% of monoaluminium phosphate, but the silica content could be increased to about 50% by decreasing the coating thickness, by applying multiple layers and by controlling the drying rate and the temperature and the humidity of the atmosphere. For the optimum compositions, a $TiB_2$ coating of good adherence was obtained on the anthracite samples. With lower amounts of colloidal silica the strength of the combusted product decreased.

FIG. 6 is a diagram schematically illustrating the wave propagation mode of the combustion reaction, as used in Example 1, when layers 51 of a micropyretic reaction mixture of Ti and B are applied from a slurry onto an anthracite sample 50. The upper part of FIG. 6 illustrates the temperature T as a function of the distance D as the reaction proceeds along reaction front 53 in the direction of arrow 54, leaving behind the $TiB_2$ product 52. Upon ignition, at the ignition temperature $T_{ig}$, the temperature rises abruptly to the combustion temperature $T_{com}$, which is the temperature at the reaction front 53. Behind the reaction front 53, in the product $TiB_2$ 52, the temperature falls gradually, which is beneficial for the homogeneity of the product. Ahead of the combustion front, the temperature decreases exponentially with distance, as illustrated. This mode of propagation in the slurry-applied mixture has been found to produce an excellent homogeneity of the reaction product and enhanced adherence to the substrate.

EXAMPLE 2

The procedure of Example 1 was repeated, with a first layer applied in 3 coatings each 150–200 micrometers thick and drying for 20 minutes, using a carrier of 50% by volume monoaluminium phosphate and 50% by volume of colloidal silica, with 1 gram of the titanium and boron reactant powders per milliliter of the carrier.

A second layer was likewise applied in 3 coatings, but this time the carrier was a commercially-available polyurethane paint thinner (PolyThin™) with the polyurethane and thinner in equal proportions by volume. The sample was then dried in air for 12 hours and preheated to 300° C. for 1 hour before combustion to remove the thinner. The sample was combusted by torch after 15–30 seconds preheating to approximately 200°–300° C.

After combustion, an adherent TiB$_2$ layer was produced. Similar coatings, but without the underlayer, did not adhere so well.

EXAMPLE 3

Example 2 was repeated except that the slurry for preparing the first (under) layer contained a mixture of Ti and B (70%–30% by weight) with Ni and Al (85%–15% by weight). The Ni and Al powders were also −325 mesh (<42 micrometers). The weight proportions of the Ti+B to Ni+Al was 91% to 9%. The top layer contained only Ti and B, as before.

Upon ignition, the combustion rate and violent character of the combustion decreased compared to Example 2. An adherent coating of TiB$_2$ having a TiB$_2$ underlayer finely mixed with Ni and Al was obtained.

EXAMPLE 4

Example 3 was repeated except that in this case, the ratio of Ti/B to carrier in the top layer was increased from 1 g/ml to 2 g/ml. After reaction, the sample was subjected to testing by immersion under molten aluminium in cryolite at 1000° C. for 1 day. The coating was found to adhere well and, because completely aluminized, protected the anthracite substrate.

EXAMPLE 5

The general procedures of the preceding examples were repeated, but including pre-formed TiB$_2$ in the slurries used to form the under and top layers.

The slurry for the first layer contained 83% by weight of Ti and B and 17% by weight of pre-formed particulate TiB$_2$, 99.5% pure, −325 mesh (<42 micrometers). The carrier was 100% monoaluminium phosphate, with 1 g of the reaction powder per milliliter of carrier. The slurry for the second layer was 75% by weight of Ti and B for 25% by weight of the aforementioned particulate TiB$_2$ in the PolyThin™ polyurethane paint-thinner carrier (1 vol. polyurethane: 2 vol. thinner).

The first and second layers were respectively 750 and 250 micrometers thick. Each applied coat was dried for 15–30 minutes with a 12 hours drying period after the application of the third coats of the first layer, and a final drying of 24 hours.

The preformed TiB$_2$ was added to control the combustion and improve the strength of the coating before combustion. After combustion, an adherent coating of TiB$_2$ was obtained.

EXAMPLE 6

Example 5 was repeated using, as carrier for the first layer, the mixture of monoaluminium phosphate and colloidal silica mentioned in Example 1, in the volume ratio 75:25. The product had a well-adhering TiB$_2$ coating on the anthracite sample and was subjected to testing by immersion in cryolite at 1000° C. for 1 day. The coating was found to adhere well and protected the anthracite substrate.

EXAMPLE 7

A first layer about 200 micrometers thick was produced as above by applying a single coat of a slurry of 90% by weight Ti and B and 10% by weight of TiB$_2$ in monoaluminium phosphate, with 2 g of the powders per milliliter of carrier.

A second layer was applied in two coats each about 400 micrometers thick from a slurry of 70% by weight of Ti and B and 30% by weight of TiB$_2$ in the previously-mentioned polyurethane paint-thinner carrier with polyurethane/thinner in equal volumes. Drying between each coating was 20 minutes followed by final drying for 24 hours in air and preheating at 300° C. for 1 hour. A well adhering coating of TiB$_2$ was obtained.

EXAMPLE 8

Example 7 was repeated but with two first layers each about 250 micrometers thick and a single second layer about 500 micrometers thick. The ratio of the particulate of the second coating slurry was 60% by weight Ti and B, and 40% by weight of TiB$_2$.

A good product was obtained, although the combustion was less continuous than with Example 7.

EXAMPLE 9

Example 7 was repeated including some silica in the first layer by using as carrier for the slurry a 75/25 volume mixture of monoaluminium phosphate and colloidal silica. The addition of colloidal silica decreased the combustion rate and led to a product with good adherence.

EXAMPLE 10

Example 9 was repeated with a slurry for producing the second coating which contained 60% by weight of Ti and B and 40% by weight of TiB$_2$. The thickness of the second coating was reduced to 500 micrometers, applied as a single layer.

After combustion, a well adhering coating of TiB$_2$ was obtained.

EXAMPLE 11

An anthracite-based cathode sample was coated with an adherent layer containing TiB$_2$ as follows.

A base layer of pre-formed particulate TiB$_2$, 99.5% pure, was applied to an anthracite cathode sample in three coats using a solution of 25 g TiB$_2$−325 mesh (<42 micrometer) in 10 ml of colloidal alumina containing about 20% of the colloid. Each coating had a thickness of 150±50 micrometer, and was dried for 10 minutes before applying the next coating.

A top layer of a micropyretic slurry containing particulate titanium and boron as reactants with pre-formed particulate $TiB_2$ as diluent and a carrier was then applied. The powder mixture was made up of 11.2 g (56% by weight) of particulate titanium, 99% pure, 4.8 g (24% by weight) of amorphous particulate boron, 92% pure, and 4 g (20% by weight) of pre-formed $TiB_2$, 99.5% pure, all these powders having a particle size corresponding to −325 mesh (<42 microns).

The carrier was 5 ml (14.3% by volume) of colloidal alumina and 20 ml (57.1% by volume) of colloidal yttria with 10 ml of polyurethane (28.6% by volume).

A single coating of this micropyretic slurry was applied on the pre-applied and dried base layer, providing a top layer having a thickness of 150±50 micrometer.

The micropyretic slurry coated on the anthracite cathode sample was then ignited by applying a combustion torch in air. The ignition temperature was about 600° C. and the combustion temperature was above 1500° C.

The resulting coated anthracite cathode sample had an adherent coating of $TiB_2$. Microscopic analysis of a cut specimen revealed a compact $TiB_2$ layer adhering firmly to the anthracite substrate.

When tested as cathode in a laboratory aluminium production cell, the sample showed perfect wettability with molten aluminium (0° contact angle) and no sign of deterioration. The aluminium was found to penetrate the coating and remain there.

EXAMPLE 12

Another anthracite-based cathode sample was coated with an adherent layer of $TiB_2$ as follows.

A base layer of pre-formed particulate $TiB_2$ was applied to the anthracite sample in two coatings using a solution of 25 g $TiB_2$–325 mesh (<42 micrometer) in 10 ml of colloidal alumina as in Example 11. Each coating had a thickness of 500±50 micrometer, and was dried for 15–30 minutes before applying the next coating.

A top layer of a micropyretic slurry containing particulate titanium and boron as reactants with pre-formed particulate $TiB_2$ as diluent and a carrier was then applied. The reactant mixture was the same as in Example 11, but the carrier in this case was 10 ml (33.3% by volume) of colloidal alumina, 10 ml (33.3% by volume) of colloidal yttria and 10 ml of polyurethane (33.3% by volume).

Two coatings of this micropyretic slurry each 500±100 micron thick were applied to the pre-applied and dried base layer, with a drying time between the two coatings of 15–30 minutes.

The micropyretic slurry coated on the anthracite-based sample was then ignited by applying a combustion torch in air.

The resulting coated anthracite cathode sample had an adherent coating of $TiB_2$. Microscopic analysis of a cut specimen revealed a compact $TiB_2$ layer adhering firmly to the anthracite substrate.

When tested as cathode in a laboratory aluminium production cell, the sample showed perfect wettability with molten aluminium (0° contact angle) and no sign of deterioration.

EXAMPLE 13

Another anthracite cathode sample was coated with an adherent layer of $TiB_2$ as follows.

A first layer of a micropyretic slurry containing particulate titanium and boron as reactants with pre-formed particulate $TiB_2$ as diluent and a carrier was applied to the anthracite sample. The powder mixture was the same as in Example 11, but the carrier was 5 ml (25% by volume) of colloidal silica, and 15 ml (75% by volume) of monoaluminium phosphate A top layer of another micropyretic slurry containing particulate titanium and boron as reactants with pre-formed particulate $TiB_2$ as diluent and a carrier was then applied. The powder mixture was the same but in a carrier of 10 ml of colloidal ceria.

The micropyretic slurry coated on the anthracite sample was then ignited by applying a combustion torch in air.

The resulting coated anthracite cathode sample had an adherent coating of $TiB_2$. When tested as cathode in a laboratory aluminium production cell, the sample also showed perfect wettability with molten aluminium (0° contact angle) and promising performance.

EXAMPLE 14

A first layer about 1 mm thick was prepared from a slurry of Ti and B powders, as before, in a 70%:30% weight ratio, mixed with particulate $TiB_2$ in a ratio of 80% by weight of Ti and B to 20% by weight of $TiB_2$, in a carrier of 3 volumes monoaluminium phosphate for 1 volume of colloidal silica. 20 grams of the particulates were suspended in 20 milliliters of the carrier.

A second layer also about 1 mm thick was applied from a slurry of 80% by weight of Ti and B and 20% by weight of $TiB_2$ in colloidal cerium acetate. 20 grams of the particulates were suspended in 40 milliliters of the carrier.

The drying time between the layers was 30 minutes with final drying for 24 hours in air before combustion.

EXAMPLE 15

Example 14 was repeated bun with a 1 mm thick underlayer formed from a slurry of 25 g of $TiB_2$ powder in 10 ml of colloidal alumina.

The coating procedure was the same as before except the slurry for forming the first layer was held mixed for 6 hours before coating. For both Examples 15 and 16, excellent adhering $TiB_2$ coatings were obtained.

EXAMPLE 16

Example 14 was repeated but 5% of aluminium was added to the two layers by including aluminium powder −325 mesh (<42 micrometers) to the respective slurries. To prevent drying cracks, the drying time had to be increased and the drying done very carefully. The resulting $TiB_2$ coating showed excellent wettability by molten aluminium.

EXAMPLE 17

Example 11 was repeated but 5% of aluminium was added to the two layers, as in Example 16, and the drying was carefully controlled to prevent cracks. The resulting $TiB_2$ coating showed excellent wettability by molten aluminium.

EXAMPLE 18

The coating of example 11 was aluminized by dipping in molten aluminium with different fluxes sprayed on top of the melt. The fluxes contained fluoride and/or chloride of lithium and/or sodium. The Kester 1544 flux is available from Kester Alloys, Chicago. The Harris Brazing flux is available from J. W. Harris & Co, Cincinnati, Ohio. The Table below shows the test conditions and results:

| Flux | Temp (C.) | Time | Results |
| --- | --- | --- | --- |
| Kester 1544 | 1000 | 2 hrs | partially wetted |
| Kester 1544 + Cryolite | 1000 | 6 hrs | mostly wetted |
| Harris Bmazing Flux | 1000 | 2 hrs | partially wetted |
| Cryolite | 1000 | 3 hrs | wetted |
| Borax | 700 | 2 hrs | wetted |

Normally, aluminization of a surface by exposure to molten aluminium may take as long as 50 hours. Partial wetting or wetting of the surface after only a few hours exposure under the flux provide an aluminized surface which, when it is later exposed to molten aluminium, wets readily. It is possible to assist aluminization by vibrating the sample exposed to molten aluminium under the flux, or by including aluminium in the refractory coating as in Example 16 and 17.

EXAMPLE 19

Graphite rods were coated as in Example 11 on all sides and tested for oxidation by placing them in an air furnace. The tested coatings were non-aluminized. The rods were weighed before and after coating, and after the given oxidation treatment. The results are as follows:

| Weight (g) | Weight of coating (g)/ thickness (mm) | Temperature & Time of oxidation | | Weight after oxidation (g) |
| --- | --- | --- | --- | --- |
| 29.55 | 0 (no coating) | 1000 C.° | <19 hrs | 0 |
| 25.00 | 1.58 (light coating ~0.5 mm) | 1000 C.° | 19 hrs | 18.65 |
| 24.53 | 3.65 (heavy coating ~1.1 mm) | 960 C.° | 20 hrs | 25.53 |

It can be seen that the uncoated rod was fully oxidised, whereas the coated rods had excellent oxygen resistance. A similar test with an anthracite rod with a light (0.2 mm) coating showed only a partial oxidation. The results indicate that the less-expensive graphite material when coated according to the invention has superior resistance to oxidation, and will be preferred over the more expensive anthracite for applications where the material is exposed to oxidation.

EXAMPLE 20

To all compositions in Examples 1–19, up to 10% of aluminium powder −325 mesh could be added in the slurry composition so that the aluminizing process on the resulting coating could be made easier and at lower temperatures.

EXAMPLE 21

All the coating compositions in the preceding Examples were found to be coatable on various metals and alloys such as Cu, Fe, Ni and their alloys.

EXAMPLE 22

The compositions of example 11 were diluted with 10% of Lithium Oxide or Chromium Mono Boride in an effort to reduce the amount of sodium ions transferred from the melt to the anthracite. The coating containing these materials was found to be adherent and conductive.

EXAMPLE 23

The composition of example 22 were coated on a carbonaceous substrate which was mostly comprised of amorphous carbon. The coating was noted to be adherent after and before aluminizing

We claim:

1. In a composite material comprising a carbonaceous, refractory or metal alloy substrate coated with a refractory material, the improvement wherein the refractory material coating comprises:

at least one compound selected from the group consisting of borides, silicides, nitrides, aluminides, carbides, phosphides, oxides, metal alloys, intermetallic compounds and mixtures thereof of at least one element selected from the group consisting of titanium, chromium, zirconium, hafnium, vanadium, silicon, niobium, tantalum, nickel, molybdenum and iron, as a first component; and a refractory oxide of an element selected from the group consisting of rare earth metals and mixtures thereof, intimately mixed with said first component.

2. The improvement of claim 1, wherein the refractory material is an aluminium-wettable refractory material.

3. The improvement of claim 2, wherein the aluminium-wettable refractory material is impregnated with aluminum.

4. An aluminium production cell comprising a component which in operation of the cell is exposed to molten aluminium, said component comprising a substrate of carbonaceous material, refractory material or metal alloy that is not wettable by molten aluminium and a coating of aluminium-wettable refractory material, as defined in claim 1.

5. The cell of claim 4, wherein the component is part of a cell bottom formed by an exposed area of carbonaceous material, an exposed area of refractory material, an exposed area of a metal alloy or an expanse comprising a plurality of exposed areas selected from carbonaceous material, refractory material and metal alloys.

6. An aluminum production cell comprising a component which in operation of the cell is exposed to molten cryolite or aluminium, said component comprising a substrate of carbonaceous material, refractory material or metal alloy that is subject to attack by molten cryolite or aluminium and a coating of refractory material, as defined in claim 1.

7. An aluminium production cell comprising a component which in operation of the cell is exposed to corrosive or oxidizing gas released in operation of the cell or present in the cell operating conditions, said component comprising a substrate of carbonaceous material, refractory material or metal alloy that is subject to attack by the corrosive or oxidizing gas and a coating of refractory material, as defined in claim 1.

8. The improvement of claim 1, wherein the coating of refractory material additionally contains oxides of lithium or potassium.

9. The improvement of claim 1, wherein the coating of refractory material additionally contains mono-borides of chromium.

10. The improvement of claim 1 wherein said oxide is ceria or yttria.

11. The improvement of claim 1, further comprising refractory oxycompounds selected from the group consisting of alumina, oxides, nitrides, carbides, silicides, aluminides of at least one element selected from the group consisting of titanium, chromium, zirconium, hafnium, lithium, silicon, niobium, titanium, nickel, molybdenum and iron.

* * * * *

UNITED STATES PATENT AND TRADEMARK OFFICE
CERTIFICATE OF CORRECTION

PATENT NO. : 5,527,442
DATED : June 18, 1996
INVENTOR(S) : Sekhar, et al.

It is certified that error appears in the above-indentified patent and that said Letters Patent is hereby corrected as shown below:

Title page, under "Primary Examiner - Donald R. Valentine" and before the "[57]" section, please insert: --Attorney, Agent or Firm - Dinsmore & Shohl--.

Signed and Sealed this

Tenth Day of September, 1996

Attest:

BRUCE LEHMAN

Attesting Officer     Commissioner of Patents and Trademarks